(12) United States Patent
Kobayashi et al.

(10) Patent No.: US 10,733,123 B2
(45) Date of Patent: Aug. 4, 2020

(54) COMPUTER SYSTEM AND ELECTRONIC APPARATUS

(71) Applicants: KABUSHIKI KAISHA TOSHIBA, Minato-ku, Tokyo (JP); Toshiba Client Solutions CO., LTD., Koto-ku, Tokyo (JP)

(72) Inventors: Hiroki Kobayashi, Tokyo (JP); Shigeo Hayashi, Tokyo (JP)

(73) Assignee: TOSHIBA CLIENT SOLUTIONS CO., LTD., Tokyo (JP)

( * ) Notice: Subject to any disclaimer, the term of this patent is extended or adjusted under 35 U.S.C. 154(b) by 171 days.

(21) Appl. No.: 15/886,166

(22) Filed: Feb. 1, 2018

(65) Prior Publication Data

US 2018/0314660 A1 Nov. 1, 2018

(30) Foreign Application Priority Data

May 1, 2017 (JP) .................................. 2017-091301

(51) Int. Cl.
*G06F 13/38* (2006.01)
*G06F 3/01* (2006.01)
*H01R 13/66* (2006.01)
*G06F 1/16* (2006.01)

(52) U.S. Cl.
CPC ................ *G06F 13/38* (2013.01); *G06F 1/16* (2013.01); *G06F 1/1658* (2013.01); *G06F 3/01* (2013.01); *H01R 13/66* (2013.01)

(58) Field of Classification Search
CPC .......... G06F 13/38; G06F 1/16; G06F 1/1658; G06F 3/01; H01R 13/66
See application file for complete search history.

(56) References Cited

U.S. PATENT DOCUMENTS

| 8,671,153 | B1 * | 3/2014 | Chu | .................... | G06F 13/4022 |
| | | | | | 709/213 |
| 2004/0177200 | A1 * | 9/2004 | Chu | .......................... | G06F 1/12 |
| | | | | | 710/301 |

FOREIGN PATENT DOCUMENTS

| JP | 2001125672 A | 5/2001 |
| JP | 3102175 U | 7/2004 |
| JP | 2008225538 A | 9/2008 |

* cited by examiner

*Primary Examiner* — Tim T Vo
*Assistant Examiner* — Herve Iradukunda
(74) *Attorney, Agent, or Firm* — Rutan & Tucker, LLP

(57) ABSTRACT

According to an embodiment, a computer system includes a main device, a first computer unit and a second computer unit. The main device includes a first accommodation portion and a second accommodation portion. The main device includes a selector switch, a first selector, a second selector and a control circuit. The first selector conducts either one of first signal lines extended from the first accommodation portion or the second accommodation portion. The second selector conducts either one of second signal lines extended from the first accommodation portion or the second accommodation portion. The control circuit controls the first selector and the second selector by the selector switch.

12 Claims, 8 Drawing Sheets

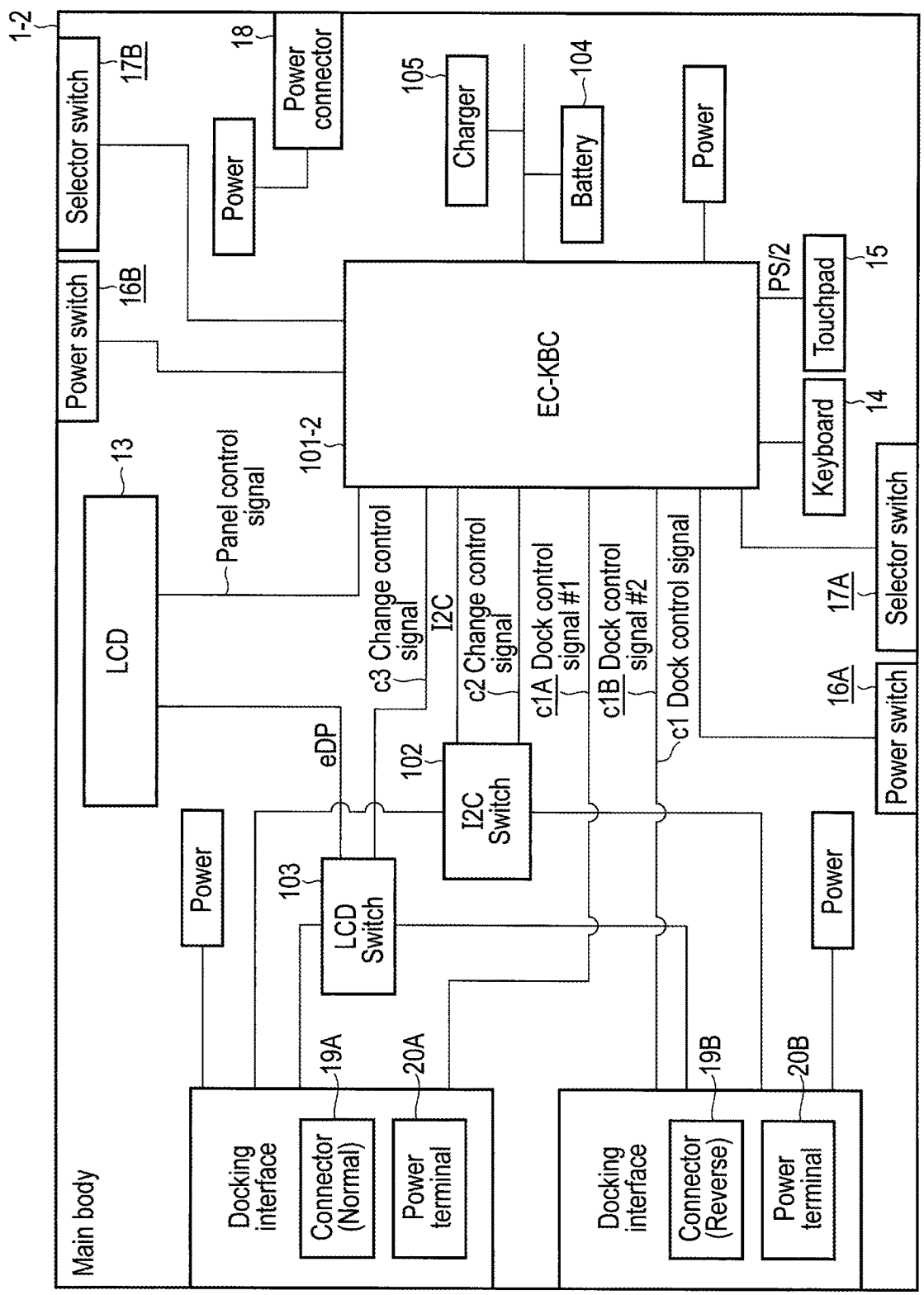
F I G. 10

COMPUTER SYSTEM AND ELECTRONIC APPARATUS

CROSS-REFERENCE TO RELATED APPLICATIONS

This application is based upon and claims the benefit of priority from Japanese Patent Application No. 2017-091301, filed May 1, 2017, the entire contents of which are incorporated herein by reference.

FIELD

Embodiments described herein relate generally to a computer system and an electronic apparatus.

BACKGROUND

Recently, various types of personal computers (PCs) have been widespread. As for business use in companies, for example, portable type PCs which can be easily carried into meetings etc., have been frequently used.

When users use such PCs for business, the users usually have needs for connecting the PCs both to the Internet and an office network, and so various security measures responding to the needs have been developed. In general, to completely eliminate a risk of information leak from the companies to the Internet and the like, an operating environment of PCs for connecting to the Internet and to the office network is desirably separated from each other. However, it will be uneconomical and inconvenient for each of the user to use two PCs, each respectively connecting to the Internet and the office network.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 10 is a diagram showing an example of function blocks of the main device in the computer system according to the second embodiment.

DETAILED DESCRIPTION

In general, according to an embodiment, a computer system includes a main device, a first computer unit and a second computer unit. The main device includes a first accommodation portion and a second accommodation portion. The first computer unit and a second computer unit have a same shape of housing. The first computer unit is accommodated in one of the first and second accommodation portions to be attachable and detachable. The second computer unit is accommodated in the other of the first and second accommodation portions to be attachable and detachable. Each of the first and second computer units includes a first connector and a second connector. The first connector is electrically connected the main device. The first connector has a first terminal assigned as a first signal line to transfer data input from an input device and a second terminal assigned as a second signal line to transfer a display signal supplied to a display device. Each of the first and second accommodation portions includes a second connector. The second connector is connected to the first connector. The main device further includes a selector switch, a first selector, a second selector and a control circuit. The first selector conducts either one of the first signal lines extended from the second connectors of the first accommodation portion or the first signal accommodation portion exclusively and selectively. The second selector conducts either one of the second signal lines extended from the second connectors of the first accommodation portion or the second accommodation portion exclusively and selectively. The control circuit is configured to control the first selector and the second selector by the selector switch.

Embodiments will be described hereinafter with reference to the accompanying drawings.

First Embodiment

First, a first embodiment will be explained.

Figure 1:
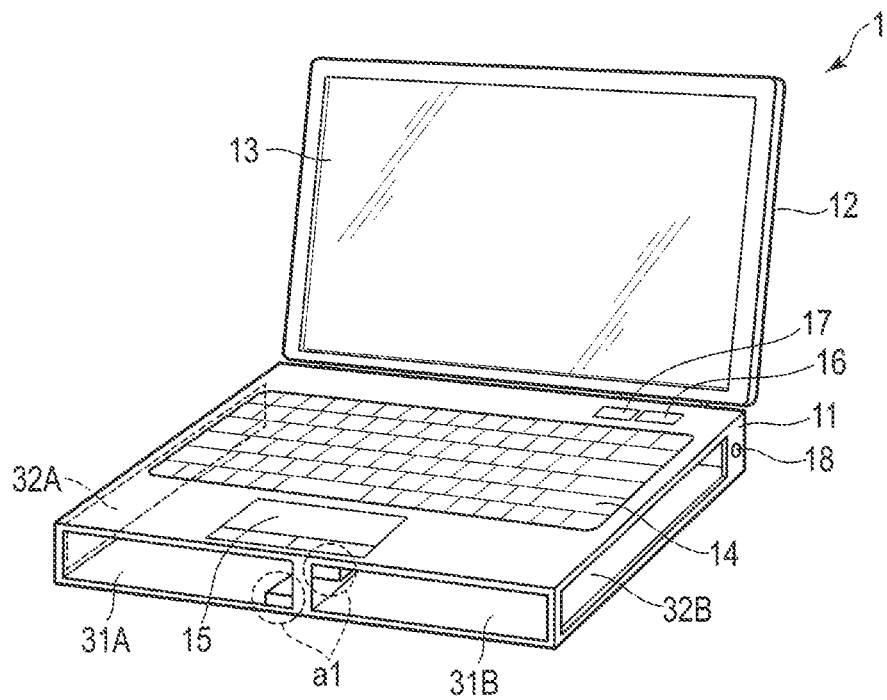
FIG. 1 is an illustration showing an example of an appearance of a main body part (main device) in a computer system according to a first embodiment.

FIG. 1 is an illustration showing an example of a main body part (main device 1) in a computer system according to the present embodiment.

The main device 1 includes a main body 11 and a lid 12 rotatably attached to the main body 11. A liquid crystal display (LCD) 13 is arranged on the lid 12 as a display unit of the computer system. A keyboard 14 and a touchpad 14 are arranged on a top surface of the main body 11 as input units of the computer system. As illustrated, an appearance of the computer system of the embodiment is the same structure as general notebook PCs.

In addition, two accommodation regions (accommodation portions 31A and 31B) of PC units 2 to be explained later are arranged in a horizontal direction (first direction) in the main device 1. The PC unit 2 is an electronic device in which operating environments of various programs including the operating system are constructed. In addition, one of the accommodation portions 31A and 31B, which is the accommodation portion 31B in this case, is inverted and provided in the main device 1. Opening portions for accommodating the PC units 2 in the accommodation portions 31A and 31B are provided on a front surface of the main body 11. The accommodation portions 31A and 31B do not need to be necessarily provided to accommodate the entire PC units 2. For example, the accommodation portions 31A and 31B may be provided such that the PC units 2 partially protrude from the opening portions on the front surface of the main body 11 when the PC units 2 are accommodated.

In other words, the computer system of the embodiment is configured to accommodate two PC units 2 (first and second computer units) respectively into the accommodation portions 31A and 31B of the main device 1, and thereby the user is able to use two separated operating environments (i.e. Internet and an office network). In addition, since the accommodation portion 31B is provided in the main device 1 while inverted (with respect to the accommodation portion 31A), the user inverts the PC unit 2 and accommodates the PC unit 2 in the accommodation portion 31B (with respect to the PC unit 2 accommodated in the accommodation portion 31A) when the PC unit 2 is accommodated in the accommodation portion 31B. Here, positioning parts (a1) are assumedly provided in the accommodation portions 31A and 31B to prevent the PC units 2 from being accommodated in the accommodation portions 31A and 31B in wrong and opposite directions. The positioning parts (a1) are not necessarily indispensable. For example, the shapes of the opening portions on the front surface of the main body 11 may have a non-point symmetry and the shapes of housings of the PC units 2 may have a non-point symmetry.

A power switch 16 and a selector switch 17 are further provided on the upper surface of the main body 11. The power switch 16 is to power on or off to PC units 2 accommodated in the accommodation portions 31A and 31B. The selector switch 17 is a switch to select the PC unit 2 accommodated in the accommodation portion 31A and the PC unit 2 accommodated in the accommodation portion 31B. The selection of the PC units 2 means selecting to change supply of data input from the keyboard 14 or the touchpad 15 to one of the PC units 2 or to change supply of a display signal from the other of the PC units 2 to the LCD 13, for example. In other words, the selector switch 17 is a switch for selecting a PC unit 2 in valid state, among the PC units 2 accommodated in the accommodation portion 31A and the accommodation portion 31B. Thus, for example, each of the PC units 2 respectively connected to the Internet and the office network, i.e., two separated operating environments can be realized by a simple changeover of the selector switch 17, even if it is provided with a sole main device 1. The computer system can also be used so that one PC unit 2 is accommodated in either one of the accommodation portions 31A and 31B.

The main device 1 further includes opening portions 32A and 32B (first and second opening portions) to expose connector groups to be explained later which are disposed on side surfaces of the PC units 2 accommodated in the accommodation portions 31A and 31B, on both side surfaces of the main body 11 facing in the horizontal direction in which the accommodation portions 31A and 31B are arranged. The connector groups are, for example, connector groups to connect an external device. As explained above, since the accommodation portion 31B is provided in the main device 1 while inverted (with respect to the accommodation portion 31A), the connector group disposed on the side surface of the PC unit 2 is exposed from the opening portion 32A or 32B even if the PC unit 2 is accommodated in either of the accommodation portions 31A and 31B. In other words, the connector group is provided on the side surface of the PC unit 2 which is to be exposed from the opening portion 32A or 32B when the PC unit 2 is accommodated in the accommodation portion 31A or 31B. An example in which each of the opening portions 32A and 32B is formed of one hole is illustrated in FIG. 1 but the opening portion may be formed of a plurality of holes disposed to expose all the connectors. A power connector 18 to input an electric power from an external power source is provided on the side surface of the main body 11.

Figure 2:
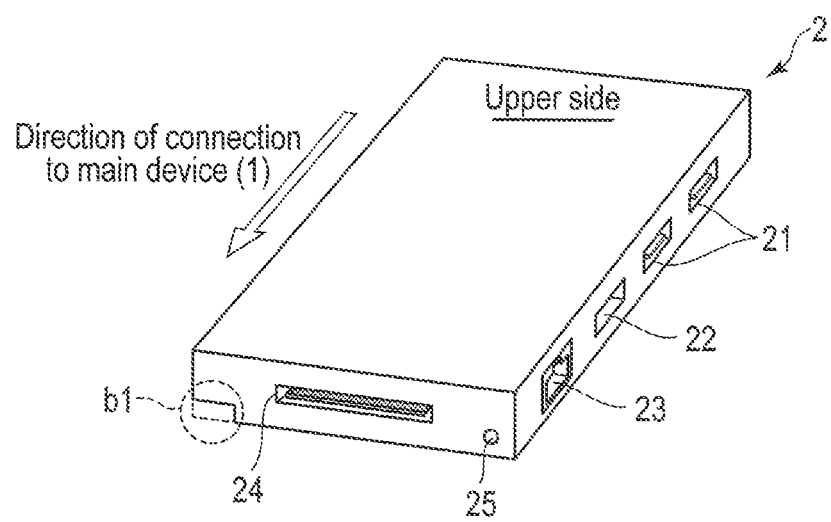
FIG. 2 is an illustration showing an example of an appearance of a PC unit in the computer system according to the first embodiment, in a general state.

FIG. 2 is an illustration showing an example of an appearance of the PC unit 2 in the computer system according to the first embodiment, in a general state. The general state indicates a state in which an upper side is located on an upper surface and a bottom side is located on a lower surface. In addition, FIG. 2 is an illustration seen from the back surface side of the PC unit 2.

As shown in FIG. 2, the above-explained connector group, more specifically, for example, a universal serial bus (USB) connector 21, a high-definition multimedia interface (HDMI; registered trademark) port 22, a local area network (LAN) connector 23, and the like are provided on the side surface of the PC unit 2. In addition, a connector 24 to electrically connect with the main device 1 and a power source terminal 25 to input an electric power from the main device 1 are provided on the back surface of the PC unit 2. A positioning part (b1) to engage with the positioning part (a1) provided in each of the accommodation portions 31A and 31B is provided on the PC unit 2. If the positioning parts (a1) are not provided on the sides of the accommodation portions 31A and 31B, the positioning part (b1) is not provided on the PC unit 2 side either. In other words, the positioning part (b1) is not indispensable.

Figure 3:
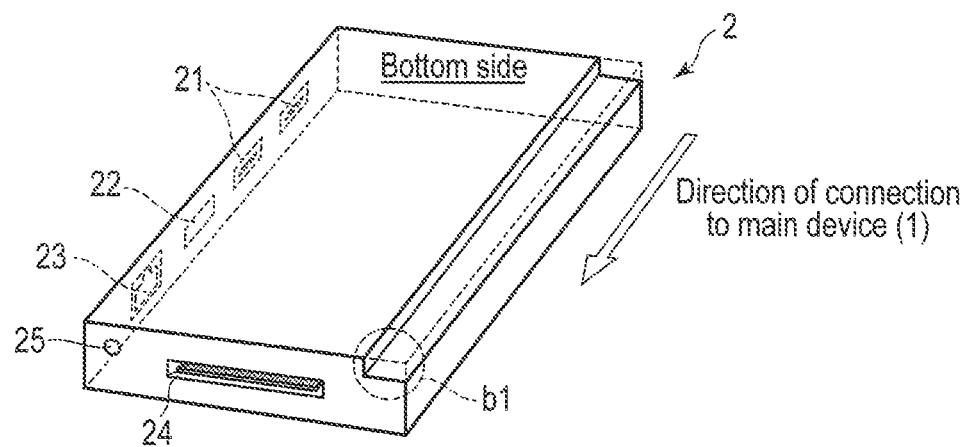
FIG. 3 is an illustration showing an example of an appearance of the PC unit of the computer system according to the first embodiment, in an inverted state.

FIG. 3 is an illustration showing an example of an appearance of the PC unit 2 in an inverted state. The inverted state indicates a state in which the upper side is located on the lower surface and the bottom side is located on the upper surface. FIG. 3 is also an illustration of the PC unit 2 seen from the back surface side.

As shown in FIG. 3, when the PC unit 2 is inverted, the connector group (USB connector 21, HDMI port 22, LAN connector 23, and the like) provided on the side surface of the PC unit 2 is located on the side opposite to the side in the general state shown in FIG. 2.

Figure 4:
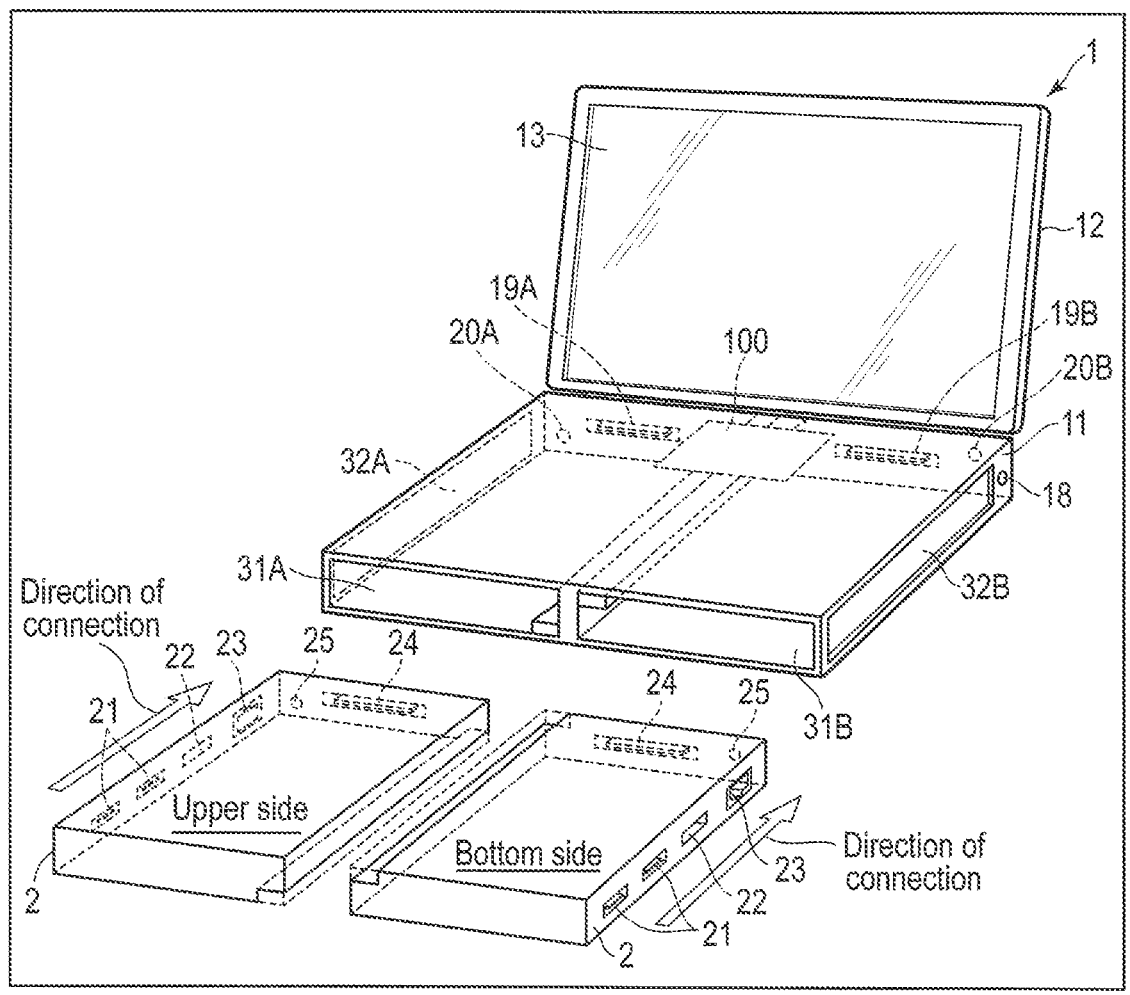
FIG. 4 is an illustration showing an orientation (state) of the PC unit when a main device is accommodated in an accommodation portion in the computer system according to the first embodiment.

FIG. 4 is an illustration showing an orientation (state) of the PC unit 2 when accommodated in each of the accommodation portions 31A and 31B of the main device 1.

As shown in FIG. 4, the PC unit 2 is accommodated in the accommodation portion 31A in the general state shown in FIG. 2 while the PC unit 2 is accommodated in the accommodation portion 31B in the inverted state shown in FIG. 3. More specifically, the PC unit 2 is accommodated in each of the accommodation portions 31A and 31B such that the connector group (USB connector 21, HDMI port 22, LAN connector 23, and the like) faces the outside of the main device 1.

As shown in FIG. 4, connectors 19A and 19B to connect with the connectors 24 of the PC units 2 and power terminals 20A and 20B to connect with the power source terminals 25 of the PC units 2 are provided in the accommodation portions 31A and 31B of the main device 1. A control board 100 on which various electronic circuits including an I2C switch 102, an LCD switch 103 and the like to be explained later are mounted is built in the main device 1.

Figure 5:
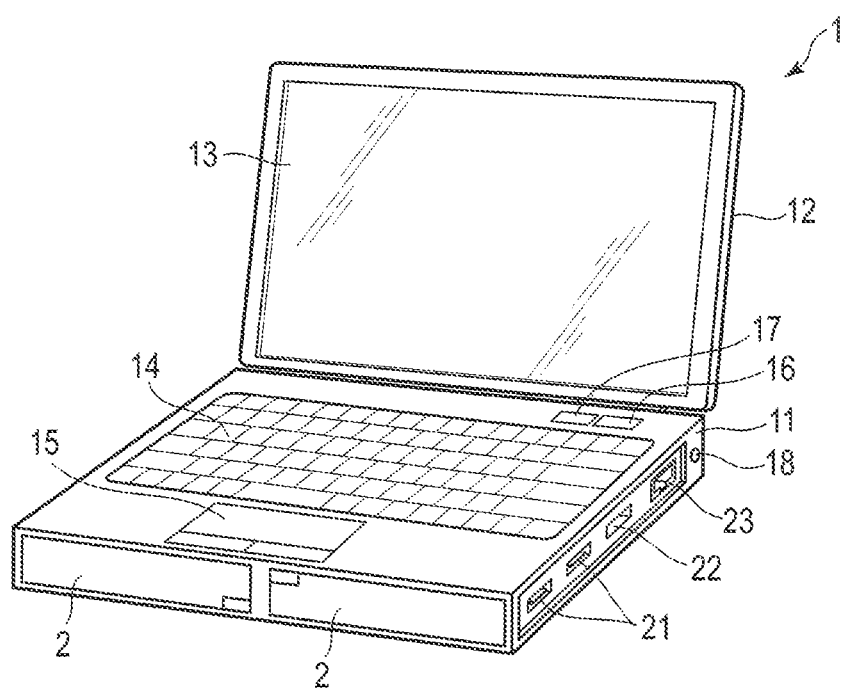
FIG. 5 is an illustration showing an example of the state in which the PC unit is accommodated in the accommodation portion of the main device in the computer system according to the first embodiment.

FIG. 5 is an illustration showing an example of a state in which the PC units 2 are accommodated in the accommodation portions 31A and 31B of the main device 1.

As shown in FIG. 5, the connector group (USB connector 21, HDMI port 22, LAN connector 23, and the like) of the PC unit 2 accommodated in the accommodation portion 31B is exposed from the opening portion 32B of the main device 1. Not shown in FIG. 5, the connector group (USB connector 21, HDMI port 22, LAN connector 23, and the like) of the PC unit 2 accommodated in the accommodation portion 31A is also exposed from the opening portion 32A of the main device 1.

Thus, in the computer system, even when the PC unit 2 having a housing of the same shape is accommodated in either of the accommodation portions 31A and 31B arranged in the horizontal direction, the connector group provided on the side surface of the PC unit 2 can be exposed from the side surface of the main device 1, based on the original idea of inverting the PC unit 2. If the connector group is provided on each side surface of the PC unit, i.e., two sets of the connector groups are provided as a measure of exposing the connector group of the PC unit 2 when accommodated in either of the accommodation portions 31A and 31B arranged in the horizontal direction, the manufacturing costs are increased and, inefficiently, only one of two sets of the connector groups can be used. Providing the connector group on the front surface of the PC unit 2, which is to be exposed from the opening portion of the front surface of the main device 1, prevents operations of the keyboard 14 and the touchpad 15 and is therefore unreal.

In addition, in the computer system, for example, a user in a meeting room preliminarily installing the main device 1 alone in the meeting room or the like and carrying an own PC unit 2 can use the PC unit 2 with the main device 1. Since two PC units 2 are the same electronic devices, convenience in exchange of the broken PC unit can also be increased.

Figure 6:
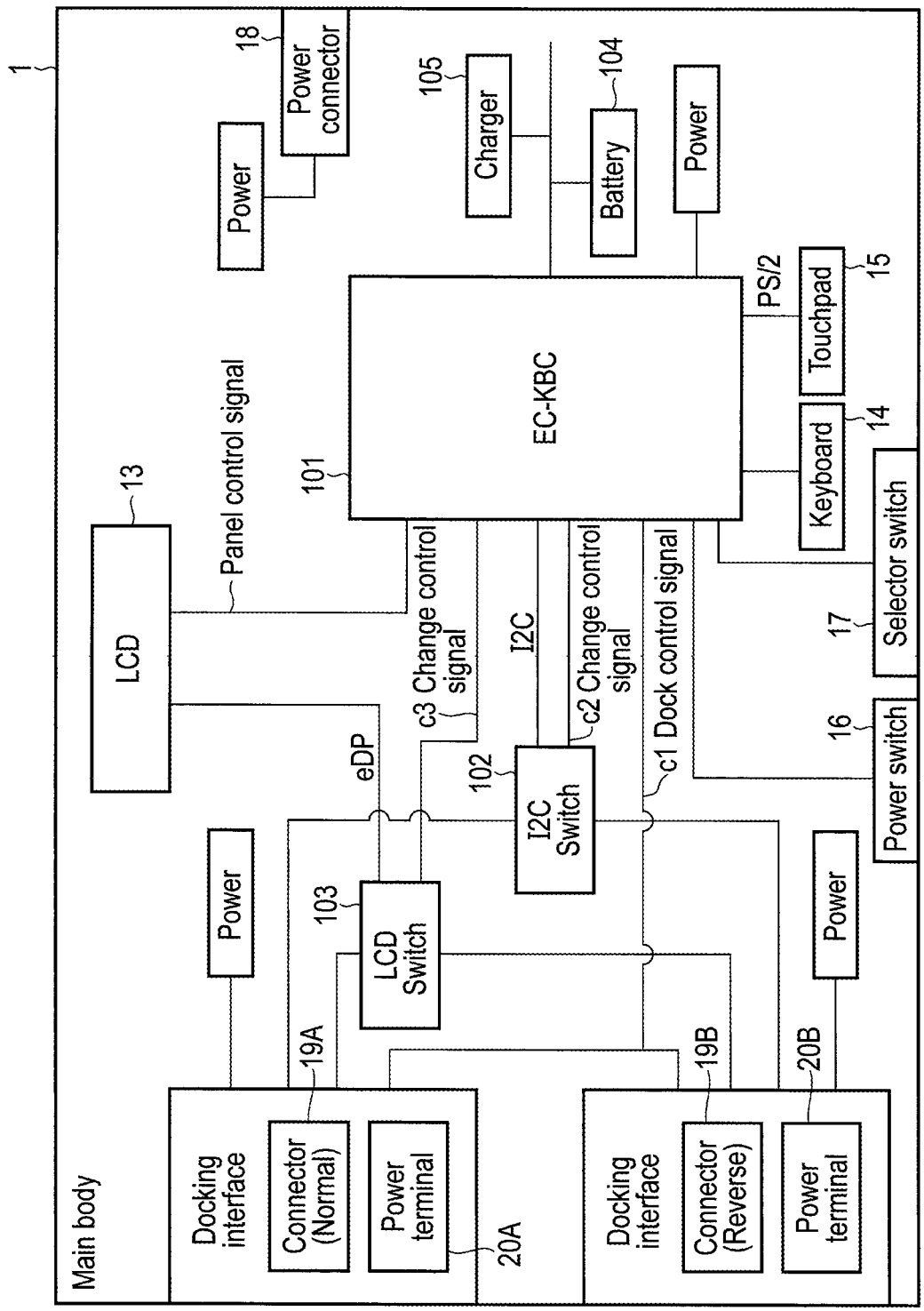
FIG. 6 is a diagram showing an example of function blocks of the main device in the computer system according to the first embodiment.

FIG. 6 is a diagram showing an example of function blocks of the main device 1.

As shown in FIG. 6, the main device 1 includes an embedded controller (EC)—keyboard controller (KBC) 101, an I2C switch 102, an LCD switch 103, a battery 104, a charger 105 and the like besides the LCD 13, the keyboard 14, the touchpad 15, the power switch 16, the selector switch 17, the power connector 18, connectors 19A and 19B and the power terminals 20A and 20B as explained above.

The EC-KBC 101 is a microcomputer which accepts the operation of the keyboard 14, the touchpad 15, the power switch 16 or the selector switch 17, and executes processing corresponding to the operation. The EC-KBC 101 outputs a Dock control signal via the connector 19A to the PC unit 2 accommodated in the accommodation portion 31A and outputs a Dock control signal via the connector 19B to the PC unit 2 accommodated in the accommodation portion 31B, in accordance with the operation of the power switch 16 (c1). The EC-KBC 101 outputs a Dock control signal to power on the PC units 2 if the power switch 16 is operated to power on the computer system, and outputs a Dock control signal to power off the PC units 2 if the power switch 16 is operated to power off the computer system. In addition, the EC-KBC 101 controls supply of the power to the PC units 2 via the power terminals 20A and 20B. The supply of the power to the PC units 2 may be executed irrespective of the input of the power from the external power source executed by the power connector 18 or may be executed only when the power is input from the external power source. The supply of the power to the PC units 2 in a case where the power is not input from the external power source is executed with the power from the battery 104 to be explained later. When the power is not input from the external power source and when the supply of the power from the main device 1 to the PC units 2 is not executed, the power for the operation of the PC units 2 is supplied from a battery 210 to be explained later. The EC-KBC 101 may execute the supply of the power to the PC units even if the computer system is in the state of power on or power off or may execute the supply of the power to the PC units only when the computer system is in the state of power on. The power supplied to the PC units 2 in a period in which the computer system is powered off is used for, for example, charging of the battery 210 and the like.

In addition, the EC-KBC 101 outputs a panel control signal to power on the PC units 2 if the power switch 16 is operated to power on the computer system, and outputs a panel control signal to power off the PC units 2 if the power switch 16 is operated to power off the computer system. The EC-KBC 101 may output a panel control signal to power off the LCD 13 in a case where the operations of the keyboard 14 and the touchpad 15 are interrupted in a period longer than a predetermined period. In this case, the EC-KBC 101 outputs the panel control signal to power on the LCD 13 in accordance with the operation of the keyboard 14 or the touchpad 15.

If the keyboard 14 or the touchpad 15 is operated when the computer system is powered on, the EC-KBC 101 outputs data indicating the operation, i.e., data input from the keyboard 14 or the touchpad 15 to the I2C bus (first signal line). The I2C bus is extended from each of the connectors 19A and 19B via an I2C switch 102 (first selector), and the I2C switch 102 includes a function of making one of the I2C buses conductive exclusively and selectively. In other words, the data input from the keyboard 14 or the touchpad 15 is transferred to either the PC unit 2 accommodated in the accommodation portion 31A or the PC unit 2 accommodated in the accommodation portion 31B by the I2C switch 102. The EC-KBC 101 controls the I2C switch 102 in accordance with the operation of the selector switch 17. More specifically, each time the selector switch 17 is operated, the EC-KBC 101 outputs a change control signal (c2) to the I2C switch 102 and circularly changes the conducted I2C bus from one of the buses to the other and vice versa.

Furthermore, the EC-KBC 101 similarly controls the LCD switch 103 (second selector) in accordance with the operation of the selector switch 17. The LCD switch 103 is provided on an embedded display port (eDP) bus (second signal line) to transfer a display signal which is to be supplied to the LCD 13, and the eDP bus is extended from the connectors 19A and 19B via the LCD switch 103. The LCD switch 103 includes a function of making one of them conductive exclusively and selectively. In other words, either the display signal from the PC unit 2 accommodated in the accommodation portion 31A or the display signal from the PC unit 2 accommodated in the accommodation portion 31B is transferred to the LCD 13. Each time the selector switch 17 is operated, the EC-KBC 101 outputs a change control signal (c3) to the LCD switch 103, and circularly changes the conductive eDP bus from one of two eDP buses extended from the connectors 19A and 19B to the other and vice versa, similarly to the case of the I2C bus. The EC-KBC 101 synchronously controls the I2C switch 102 and the LCD switch 103 such that the I2C bus made conductive by the I2C switch 102 and the eDP bus made conductive by the LCD switch 103 are on the same side of the connectors 19A and 19B.

The EC-KBC 101 can operate with the power from the external power source which is input from the power connector 18 or operates with the power from the battery 104. More specifically, the EC-KBC 101 operates with the power from the external power source if the power from the external power source is input via the power connector 18 or operates with the power from the battery 104 if the power from the external power source is not input from the power connector 18. The charger 105 is a circuit which charges the battery 104 with the power from the external power source, under control of the EC-KBC 101. In other words, the EC-KBC 101 includes a function of charging and discharging the battery 104. In addition, the power from the external power source which is input via the power connector 18 or the power from the battery 104 is supplied to the EC-KBC 101, too, in a period in which the computer system is powered off.

The user can thereby use two PC units 2 while changing the units by operating the power switch 16, powering on the computer system, more specifically, the PC unit 2 accommodated in the accommodation portion 31A and the PC unit 2 accommodated in the accommodation portion 31B, and operating the selector switch 17. Since the PC unit 2 is inverted and accommodated in the accommodation portion 31B, the connector group provided on the side surface of the PC unit 2 can be exposed and used at any time when accommodated in any one of the accommodation portions 31A and 31B.

Figure 7:
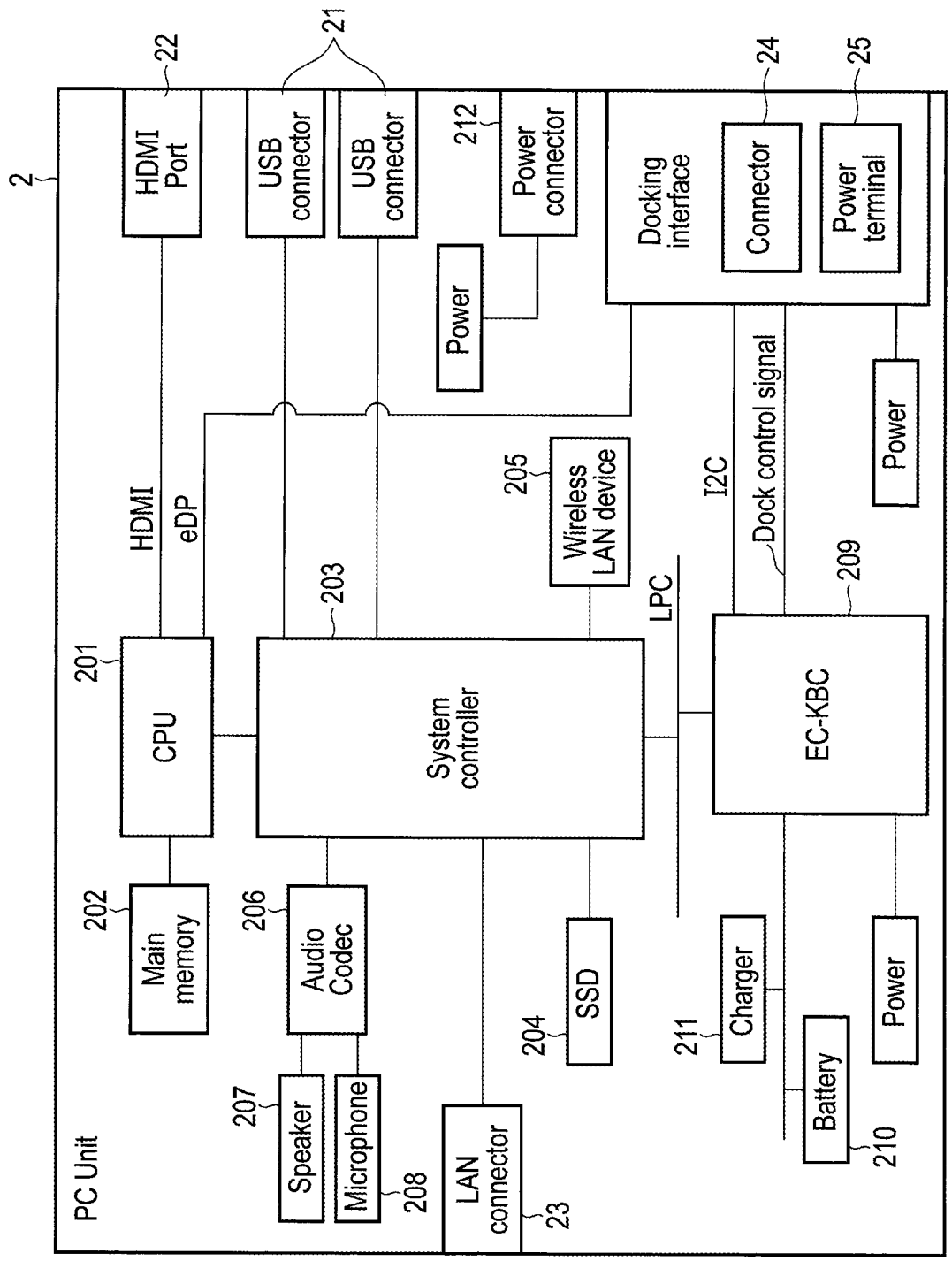
FIG. 7 is a diagram showing an example of function blocks of the PC unit in the computer system according to the first embodiment.

FIG. 7 is a diagram showing an example of function blocks of the PC unit 2.

As shown in FIG. 7, the PC unit 2 includes a central processing unit (CPU) 201, a main memory 202, a system controller 203, a solid state drive (SSD) 204, a wireless LAN device 205, an audio codec (Codec) 206, a speaker 207, a microphone 208 and the like in addition to the USB connector 21, the HDMI port 22, the LAN connector 23, the connector 24 and the power terminal 25 which have been explained above. The PC unit 2 also includes an EC-KBC 209, a battery 210, a charger 211, a power connector 212, and the like.

The CPU 201 is a processor which controls an operation of each component in the PC unit 2. The CPU 201 loads various types of programs installed in the SSD 204 into the main memory 202 and executes the programs. The CPU 201 also includes a function of a graphics processing unit (GPU) which generates a display signal from the display data of various programs. The display signal generated by the CPU 201 is supplied to the main device 1 side via a terminal (second terminal) of the connector 24 by an eDP bus. The CPU 201 can also generate an HDMI signal from display data and audio data of various programs. The HDMI signal generated by the CPU 201 is output to an external display device via an HDMI port 22.

The system controller 203 is a bridge device which makes connection between the CPU 201 and each of the components. The system controller 203 incorporates a serial ATA (SATA) controller which controls the SSD 204. In addition, the system controller 203 includes a function of transmitting data to and receiving data from a USB device connected to the USB connector 21. Furthermore, the system controller 203 includes a wired communication function of establishing communication with an external device connected via the LAN connector 23. In addition, the system controller 203 includes a function of transmitting data to and receiving data from an external device via a wireless LAN device 205 without using a cable. The system controller 203 also includes a function of outputting sound from a speaker 207 via an audio codec 206 and a function of inputting sound from a microphone 208 via the audio codec 206. The audio codec 206 is a module which executes coding and decoding of the sound.

First, the EC-KBC 209 includes a function of powering on or off the PC units 2, based on a Dock control signal transferred via a terminal (third terminal) of the connector 24. The EC-KBC 209 executes power control to supply the power from the main device 1 via the power terminal 25 or the power from the battery 210 to each of the components. The charger 211 is a circuit which charges the battery 210 with the power from the main device 1 or the power input from the external power source via the power connector 212, under control of the EC-KBC 209. In other words, the EC-KBC 209 includes a function of charging and discharging the battery 210. The power is also supplied from the battery 210 to the EC-KBC 209 in a period in which the PC unit 2 is powered off. The power connector 212 is a connector for charging the battery 210 by the PC units 2 alone, and may be provided at a position corresponding to the opening portion 32A or 32B of the main device 1 or the other position. Charging the battery 210 can also be executed in a period in which the PC unit 2 is powered off.

Secondly, the EC-KBC 209 includes a function of delivering the transfer data on the I2C bus, i.e., data input from the keyboard 14 or the touchpad 15 to the CPU 201. If the EC-KBC 209 receives the data transferred via a terminal (first terminal) of the connector 24, the EC-KBC 209 stores the data in a built-in register and supplies an interrupt signal to the CPU 201. The CPU 201 receiving the interrupt signal reads data from the built-in register of the EC-KBC 209.

The PC unit 2 is supplied with the data input from the keyboard 14 or the touchpad 15 and displayed with the signal output from the own unit 2 on the LCD 13, if the I2C switch 102 and the LCD switch 103 of the main device 1 are in a state that the I2C bus and the eDP bus of the own side are made conductive. That is, the same operations as those of general PCs are executed. Thus, for example, if the PC unit 2 accommodated in the accommodation portion 31A is connected to the Internet, the PC unit 2 accommodated in the accommodation portion 31B is connected to the office network, and the PC units 2 to make the I2C bus and the eDP bus conductive are changed by the selector switch 17, two separated operating environments can be used on one main device 1. In addition, efficient use of the connector groups of the PC units 2 can be implemented by the original idea of inverting one of two PC units 2 as explained above.

Figure 8:
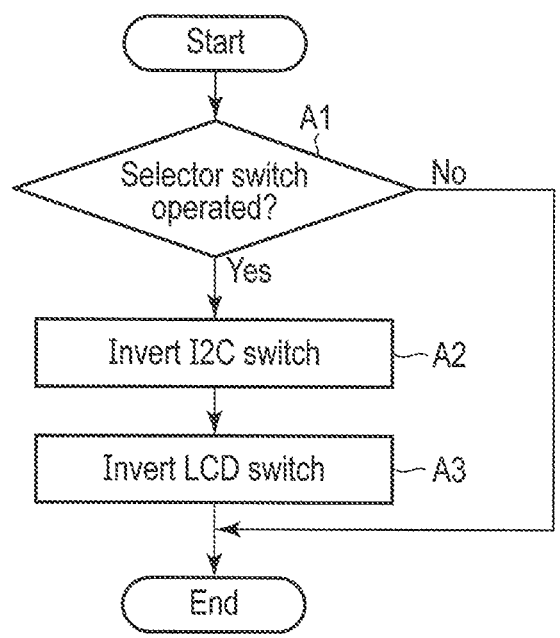
FIG. 8 is a flowchart showing operation steps concerning operations of a selector switch of the main device in the computer system according to the first embodiment.

FIG. 8 is a flowchart showing operation steps concerning the operations of the selector switch 17 of the main device 1 (EC-KBC 101) in the computer system.

If the selector switch 17 is operated (Yes in step A1), the EC-KBC 101 inverts the I2C switch 102 (step A2) and inverts the LCD switch 103 (step A3).

Steps of the operation of the power switch 16 are general steps of outputting the Dock control signal to power on or off the PC units 2 and their explanations are omitted here.

As explained above, two separated operating environments can be used on one device with a good efficiency, according to the computer system.

Second Embodiment

Next, a second embodiment will be explained. The same constituent elements as those of the first embodiment are denoted by the same reference numerals, and their explanations are omitted.

Figure 9:
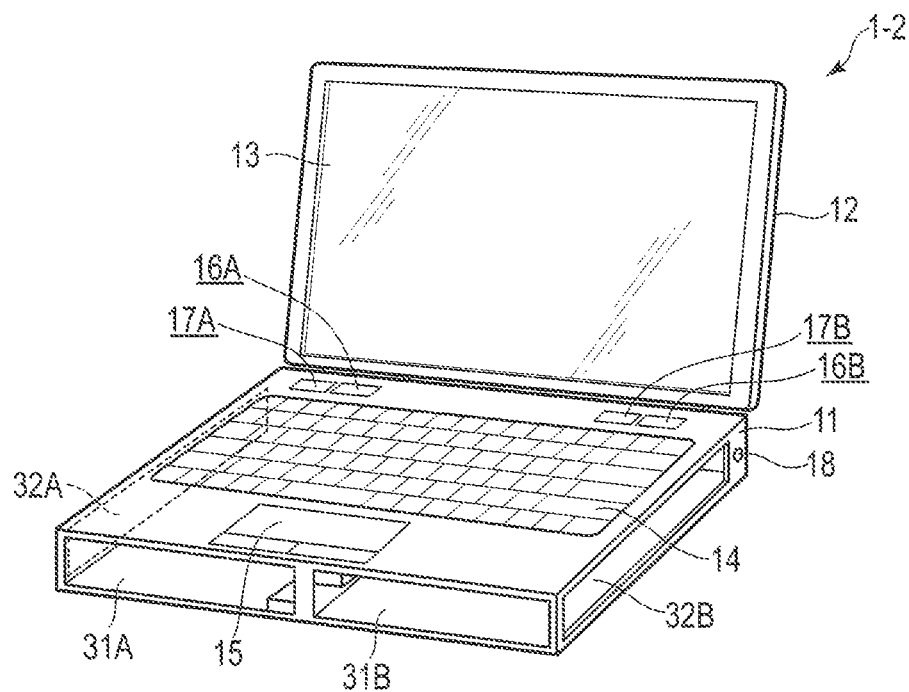
FIG. 9 is an illustration showing an example of an appearance of a main body part (main device) in a computer system according to a second embodiment.

FIG. 9 is an illustration showing an example of an appearance of a main body part (main device 1-2) in a computer system according to the present embodiment.

The main device 1-2 of the computer system includes two power switches, i.e., a power switch 16A to power on or off a PC unit 2 accommodated in an accommodation portion 31A and a power switch 16B to power on or off a PC unit 2 accommodated in an accommodation portion 31B. In other words, the PC units 2 accommodated in the accommodation portions 31A and 31B can be individually powered on or off in the computer system.

In addition, the main device 1-2 of the computer system includes two power switches, i.e., a selector switch 17A to activate the PC unit 2 accommodated in the accommodation portion 31A and a selector switch 17B to activate the PC unit 2 accommodated in the accommodation portion 31B. Activating the PC unit 2 indicates making an I2C bus and an eDP bus conductive. In other words, the selector switch 17A is operated to activate the PC unit 2 accommodated in the accommodation portion 31A while the selector switch 17B is operated to activate the PC unit 2 accommodated in the accommodation portion 31B, in the computer system. As compared with circularly changing the activated PC units 2 by one selector switch, (it is unnecessary to recognize which PC unit 2 is activated and) the change of the target PC unit 2 can easily be recognized intuitively. Of course, only one selector switch may be provided similarly to the first embodiment, when two power switches 16A and 16B are provided. Furthermore, two selector switches may be provided when only one power switch 16 is provided similarly to the first embodiment.

FIG. 10 is a diagram showing an example of function blocks of the main device 1-2.

As explained above, the main device 1-2 includes the power switches 16A and 16B and the selector switches 17A and 17B. If the power switch 16A is operated, the EC-KBC 101-2 of the main device 1-2 outputs a Dock control signal #1 to the PC unit 2 accommodated in the accommodation portion 31A via a connector 19A (c1A). More specifically, if the power switch 16A is operated to power on the PC unit 2 accommodated in the accommodation portion 31A the Dock control signal #1 to power on the PC unit 2 is output via the connector 19A while, if the power switch 16A is operated to power off the PC unit 2 accommodated in the accommodation portion 31A the Dock control signal #1 to power off the PC unit 2 is output via the connector 19A. If the power switch 16B is operated the EC-KBC 101-2 of the main device 1-2 outputs a Dock control signal #2 to the PC unit 2 accommodated in an accommodation portion 31B via a connector 19B (c1B). More specifically, if the power switch 16B is operated to power on the PC unit 2 accommodated in the accommodation portion 31B the Dock control signal #2 to power on the PC unit 2 is output via the connector 19B while, if the power switch 16B is operated to power off the PC unit 2 accommodated in the accommodation portion 31B the Dock control signal #2 to power off the PC unit 2 is output via the connector 19B. The Dock control signal #1 is the same as the Dock control signal #2.

In addition, if the selector switch 17A is operated and if the I2C switch 102 and the LCD switch 103 are not in a state of conducting the I2C bus and the eDP bus extended from the connector 19A, i.e., if the switches are in a state of conducting the I2C bus and the eDP bus extended from the connector 19B, the EC-KBC 101-2 outputs the change control signals (c2 and c3) to execute the change of the I2C switch 102 and the LCD switch 103. In addition, if the selector switch 17A is operated and if the I2C switch 102 and the LCD switch 103 are not in a state of making the I2C bus and the eDP bus extended from the connector 19B conductive, i.e., if the switches are in a state of making the I2C bus and the eDP bus extended from the connector 19A conductive, the EC-KBC 101-2 outputs the change control signals (c2 and c3) to execute the change of the I2C switch 102 and the LCD switch 103.

In the computer system, it is possible for one of two PC units 2 to be powered off and exchanged while using the other of the PC units 2, for example. In addition, it is possible only for a PC unit 2 newly accommodated in the main device 1 to be instructed to power on after the exchange.

In the computer system of the embodiment, efficient use of the connector groups of the PC units 2 can be implemented by a conception that inverts one of two PC units 2.

Figure 11:
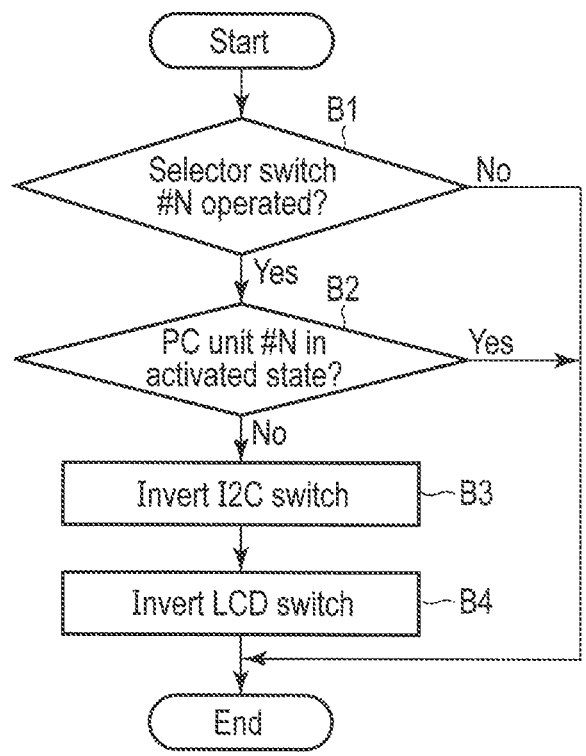
FIG. 11 is a flowchart showing operation steps concerning operations of a selector switch of the main device in the computer system according to the second embodiment.

FIG. 11 is a flowchart showing operation steps concerning the operations of the selector switches 17A and 17B of the main device 1-2 (EC-KBC 101-2) in the computer system.

If one of the selector switches 17A and 17B is operated (Yes in step B1), the EC-KBC 101-2 determines whether the PC unit 2 corresponding to the operated selector switch is in an activated state or not (step B2). If the PC unit 2 is not in the activated state (No in step B2), the EC-KBC 101-2 inverts the I2C switch 102 (step B3) and inverts the LCD switch 103 (step B4).

Steps of the operation of the power switches 16A and 16B are general steps of outputting the Dock control signal to power on or off the corresponding PC units 2 and their explanations are omitted here.

As explained above, two separated operating environments can be used on one device with a good efficiency, according to the computer system.

Incidentally, the example of providing the opening portions for accommodating the PC units 2 in the accommodation portions 31A and 31B of the main device (1, 1-2) on the front surface of the main device 1 is explained in the above descriptions. In addition, the example of providing the opening portions 32A and 32B for exposing the connector group (USB connector 21, HDMI port 22, LAN connector 23 and the like) provided on the side surface of the PC unit 2 accommodated in each of the accommodation portions 31A and 31B, on the side surfaces of the main device (1, 1-2), is explained in the above descriptions.

Figure 12:
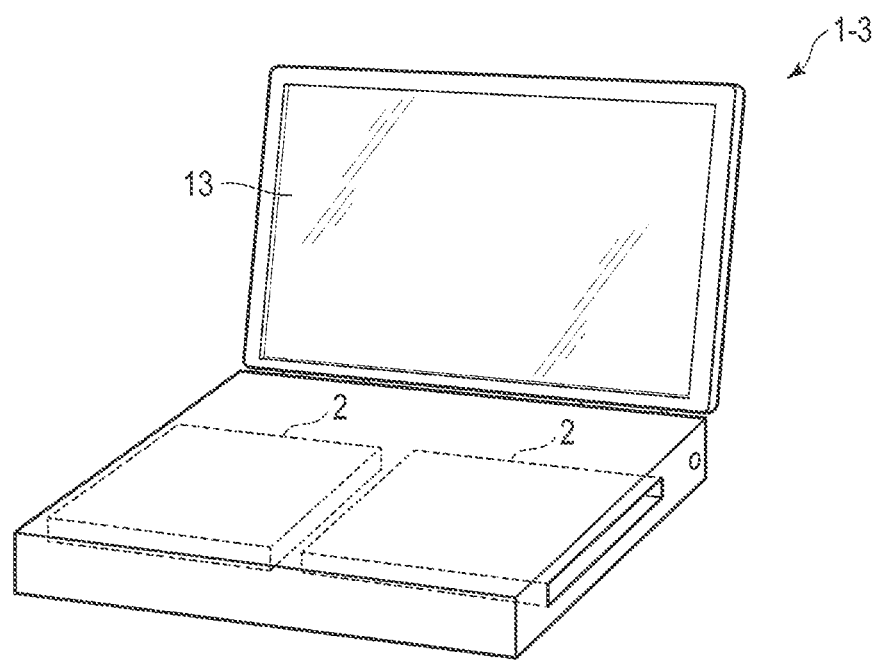
FIG. 12 is an illustration showing a modified example of the main device in the computer system according to the first embodiment or the second embodiment.

As shown in FIG. 12, for example, providing the opening portions for accommodating the PC units 2 in the accommodation portions 31A and 31B of a main device (1-3) on respective side surfaces of the main device (1-3), and the connector group (USB connector 21, HDMI port 22, LAN connector 23 and the like) on the front surface of each of the PC units 2 exposed from the opening portions, does not prevent the operation of the keyboard 14 or the touchpad 15 or does not require one of the PC units 2 to be inverted, and can achieve the same advantages as those of the first embodiment or the second embodiment.

The example in which the main device (1, 1-2) includes the LCD 13, the keyboard 14, and the touchpad 15 is explained in the above descriptions, but the main device may not include these and a connector for connecting the LCD, the keyboard, the pointing device and the like may be provided in the main device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A computer system comprising:
a main device including a first accommodation portion and a second accommodation portion that is inverted with respect to the first accommodation portion, each of the first accommodation portion and the second accommodation portion including a second connector and being arranged in a first direction; and
a first computer unit configured to be accommodated in one of the first and second accommodation portions and a second computer unit configured to be accommodated in the other of the first and second accommodation portions, each of the first computer unit and the second computer unit includes a first connector electrically connected to the main device and configured to be electrically connected to the second connector, the first connector including a first terminal assigned as a first signal line to transfer data input from an input device and a second terminal assigned as a second signal line to transfer a display signal supplied to a display device,
wherein:
the main device further includes
a selector switch,
a first selector conducting either one of the first signal lines extended from the second connectors of the first accommodation portion or the second accommodation portion exclusively and selectively,
a second selector conducting either one of the second signal lines extended from the second connectors of the first accommodation portion or the second accommodation portion exclusively and selectively, and
a control circuit configured to control the first selector and the second selector by the selector switch,
a third connector for connecting with an external device is provided on a side surface on which a housing of the first computer unit and the second computer unit is oriented in the first direction when accommodated in the first accommodation portion and the second accommodation portion;
a first opening portion for exposing the third connector of the first computer unit or the second computer unit accommodated in the first accommodation portion is provided on one of two side surfaces facing the first direction, of a housing of the main device; and
a second opening portion for exposing the third connector of, one of the first computer unit and the second computer unit that are accommodated in the first accommodation portion or another of the first computer unit and the second computer unit that are inverted and accommodated in the second accommodation portion, the second opening portion being provided on the other of two side surfaces facing in the first direction, of the housing of the main device.

2. The computer system of claim 1, wherein:
the first connector includes a third terminal assigned a third signal line to transfer a control signal controlling power on or off;
the main device includes a power switch; and
the control circuit is configured to control output of the control signal to the third signal line extended from the second connectors of the first accommodation portion or output of the control signal to the third signal line extended from the second connector of the second accommodation portion by the power switch.

3. The computer system of claim 2, wherein:
the power switch includes a first power switch portion and a second power switch portion; and
the control circuit is configured to control output of the control signal to the third signal line extended from the second connector of the first accommodation portion by the first power switch portion, and to control output of the control signal to the third signal line extended from the second connector of the second accommodation portion by the second power switch portion.

4. The computer system of claim 3, wherein:
the selector switch includes a first selector switch portion and a second selector switch portion; and
the control circuit is configured to control the first selector by the first selector switch portion, and to control the second selector by the second selector switch portion.

5. The computer system of claim 1, wherein:
each of the first and second computer units includes a first positioning part; and
each of the first and second accommodation portions includes a second positioning part engaging with the first positioning part.

6. The computer system of claim 1, wherein a housing of the first computer unit is the same as a housing of the second computer unit.

7. An electronic apparatus comprising:
a main body;
a first accommodation portion, in which a computer unit is accommodated to be attachable and detachable, formed in the main body;
a second accommodation portion, in which a computer unit is accommodated to be attachable and detachable, formed in the main body;
a first signal line extended from the first accommodation portion and the second accommodation portion to transfer data input from an input device;
a second signal line extended from the first accommodation portion and the second accommodation portion to transfer a display signal supplied to a display device;
a selector switch;
a first selector conducting either one of the first signal lines extended from the first accommodation portion or the second accommodation portion exclusively and selectively;
a second selector conducting either one of the second signal lines extended from the first accommodation portion or the second accommodation portion exclusively and selectively; and
a control circuit configured to control the first selector and the second selector by the selector switch, wherein
the first accommodation portion and the second accommodation portion are arranged along a first direction and the second accommodation portion is inverted and disposed together with the first accommodation portion,
a first opening portion, for exposing a connector provided on a side surface of the computer unit accommodated in the first accommodation portion, is provided on one of two side surfaces facing a direction along the first direction, of the main body, and
a second opening portion, for exposing a connector of the computer unit accommodated in the second accommodation portion and the computer unit inverted and accommodated in the second accommodation portion, is provided on the other of two side surfaces facing a direction along the first direction, of the main body.

8. The electronic apparatus of claim 7, further comprising:
a third signal line extended from the first accommodation portion and the second accommodation portion to transfer a control signal controlling power on or off of the computer unit; and
a power switch,
wherein the control circuit is configured to control output of the control signal to either one of the third signal lines extended from the first accommodation portion or the second accommodation portion by the power switch.

9. The electronic apparatus of claim 8, wherein:
the power switch includes a first power switch portion and a second power switch portion; and
the control circuit is configured to control output of the control signal to the third signal line extended from the first accommodation portion by the first power switch portion, and to control output of the control signal to the third signal line extended from the second accommodation portion by the second power switch portion.

10. The electronic device of claim 9, wherein:
the selector switch includes a first selector switch portion and a second selector switch portion; and
the control circuit is configured to control the first selector by the first selector switch portion, and to control the second selector by the second selector switch portion.

11. The electronic device of claim 7, wherein each of the first and second accommodation portions includes a second positioning part engaging with a first positioning part provided at the computer unit.

12. An electronic apparatus comprising:
a main body including a first accommodation portion and a second accommodation portion that is inverted with respect to the first accommodation portion, wherein the first accommodation portion includes a first connector and the second accommodation portion includes a second connector,
a computer unit configured to be accommodated in the first accommodation portion or in the second accommodation portion, the computer unit is electronically coupled to the first connector located within the first accommodation portion when the first computer unit is positioned within the first accommodation portion and the computer unit is electronically coupled to the second connector located within the second accommodation portion when the computer unit is positioned within the second accommodation portion,
wherein the main body further includes a selector switch, a first selector conducting either a first signal lines extended from the first accommodation portion to an input device or a second signal lines extending from the second accommodation portion to the input device, a second selector conducting either a third signal lines extended from the first accommodation portion to a display device or the a fourth signal lines extending from the second accommodation portion to the display device, and a control circuit configured to control the first selector and the second selector by the selector switch,
wherein the main body includes a first opening portion for exposing a connector provided on a side surface of the computer unit accommodated in the first accommodation portion, the connector being provided on one of two side surfaces facing a first direction; and
a second opening portion for exposing the connector of the computer unit accommodated in the second accommodation portion and the computer unit inverted and accommodated in the second accommodation portion so that the connector is facing a direction opposite the first direction.

* * * * *